Jan. 22, 1963 — C. L. HILL — 3,074,674
SUPPORT AND HOLDER DEVICE FOR FISHING RODS
Filed Dec. 20, 1960
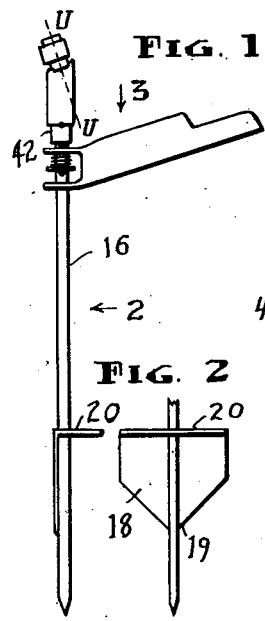
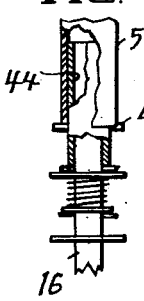
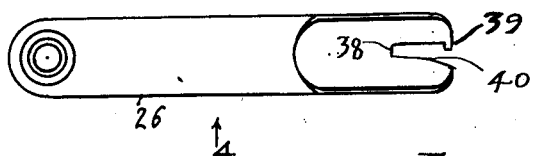
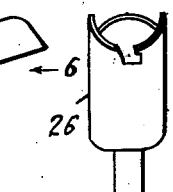
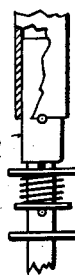
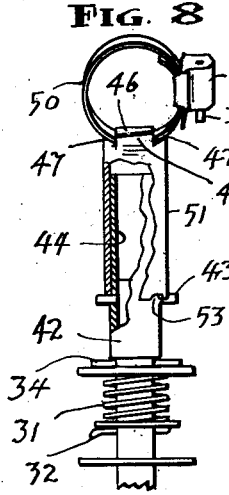
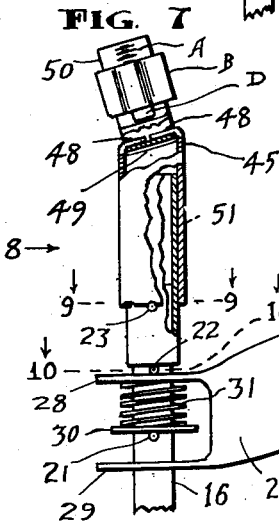
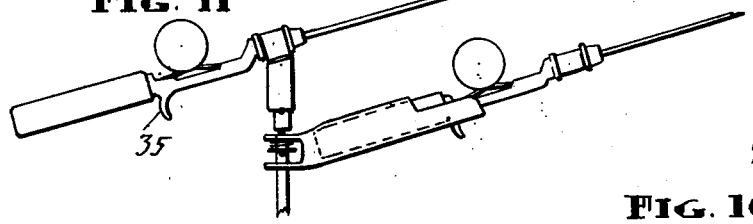
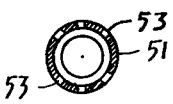
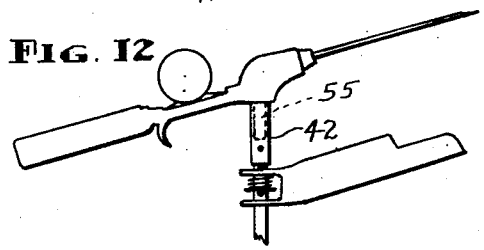
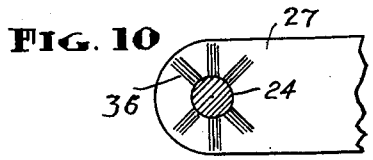
INVENTOR
CLARENCE L. HILL
Thomas L. Ryan
ATTORNEY 3,074,674
Patented Jan. 22, 1963

3,074,674
SUPPORT AND HOLDER DEVICE FOR
FISHING RODS
Clarence L. Hill, 1311 E. 5th St., Muncie, Ind.
Filed Dec. 20, 1960, Ser. No. 77,047
3 Claims. (Cl. 248—45)

This invention relates to improvements in angler equipment.

A long time need of the angler has been that of a practicable device capable of being conveniently transported and installed near to the fishing waters, and of there receiving, supporting, and holding fishing rods, at such periods as the angler may desire, during the times intervening the activities of the baiting, the casting, and the reeling of the line.

To provide a device by which the above named advantage may be afforded, such device to be of minimum bulk and weight, simple of construction, economical of manufacture, durable and dependable, and easy to use, is the object, broadly stated, of my invention. Said general object, as well as other and specific aims, as will presently appear, are accomplished by, and my invention is contained in the new construction combination and arrangement of parts described in the following specification, and illustrated in the accompanying drawings.

In the drawings

FIG. 1 is a diagrammatic elevational view of my new support and holder for fishing rods.

FIG. 2 is an elevational view in the direction of arrow 2 in FIG. 1, of the lower portion of said device.

FIG. 3 is an enlarged top plan view in the direction of arrow 3 in FIG. 1.

FIG. 4 is a side view in the direction of arrow 4 in FIG. 3.

FIG. 5 is a side view in the direction of arrow 5 in FIG. 4.

FIG. 6 is a view in the direction of arrow 6 in FIG. 4.

FIG. 7 is an enlarged elevational view of the upper portion of the stanchion and the clamp type holder, portions thereof being broken away.

FIG. 8 is a side view in the direction of arrow 8 in FIG. 7 parts thereof partially broken away.

FIG. 9 is a sectional top plan view at broken line 9—9 in the direction of arrow 9 in FIG. 7.

FIG. 10 is a sectional top plan view at broken line 10—10 in the direction of arrow 10 in FIG. 7.

FIG. 11 is a diagrammatic view showing the fishing rods as they appear supported and held in position, one in the lower or socket type holder; the other, in the upper, or clamp type holder.

FIG. 12 is a diagrammatic view which indicates how the head stock of the stanchion lends itself to the accommodation of a fishing rod of the type in which the handle portion embodies a pintle.

A strong but slender stanchion comprises stiff metal staff 16 provided at its tapered lower portion with transverse anchor plate 18 pointed at its lower end 19 and having its upper marginal portion turned at a right angle to form flange 20. The standard so formed is capable of being readily installed on the ground, or on a platform or deck to which the flange may be seated.

At a predetermined point spaced from the top of said staff, extends diametrically therethrough a hole 21; and, at a predetermined point above said hole 21 there extends through said staff, a second or upper diametric hole 22. Spaced above said hole 22, and near the top of said staff is hole 23. See FIG. 7.

A member I denote as a socket type holder consists of a tubular body 26 made of sheet metal, as steel or aluminum, the inboard or root part of which I denote as bearing 27. Said bearing is transversely bifurcated branch 28 and branch 29 spaced, one above the other, and each directed at an angle of approximately fifteen degrees to the longitudinal axis of the holder. Each of said ears has bore 24 of diameter to fittingly receive the stanchion staff 16.

Combining this socket type holder with said staff 16 consists of inserting the upper end of the staff through lower branch 29 and through a washer 30 and through a helical spring 31, thence through upper branch 28; then applying cotter 32 at hole 21 of said staff 16. Then upon depressing the upper branch 28 and applying drive pin 34 at hole 22 the holder member will have become journaled for turning movement on a horizontal plane, and, by the spring will be supported frictionally against pin 34.

In the top surface of upper branch 28 are provided radial depressions 36 which will presently be referred to. See FIG. 10.

The said socket type holder 26, cylindrical in cross section, constitutes a receptor of length to receive the handle of a conventional fishing rod of the kind indicated in the diagrammatic view FIG. 11, having finger hook 35. The upper part of the outboard portion of said holder is cut, away, to afford clearance for convenience in handling of the line and reel. In the lower portion of the outboard end of said holder a V shaped left 38 having at a side of the mouth thereof, an inturned tooth 39, and at the opposite side thereof, and spaced from said mouth, a hump 40. As the angler passes the handle of the fishing rod into said holder, and the finger hook passes the hump 40, it comes to rest behind the said tooth and in tightened engagement with the sides of said cleft.

The spring 31 functions to support the holder, and also to maintain frictional contact of branch 28 against cross pin 34 engaged in radial recesses 36 (see FIG. 10) thereby snubbing the holder at the position to which it is turned and set by the angler.

Embodied with the top portion of said staff 16, is head stock 42. It consists of a length of tubing in the bore 44 of which the end portion of said staff is received, said tubing being secured to said staff by a driven-fit pin at hole 23, the ends of said pin forming external studs 43, shown in FIG. 4. See FIG. 8.

By the combination and arrangement as above described, there is enabled the support of a fishing rod carried by said socket type holder, and of a second fishing rod carried by a second holder, which I denote as a clamp type holder. By clamp holder being meant a clamp which engages the fishing rod handle crosswise, as distinguished from the socket wherein the fishing rod handle is engaged lengthwise. It comprises a conventional worm-drive clamp which consists of a resilient steel strip of predetermined length, curled to form a divided annular band 50 and which is provided with transverse slots A spaced successively through a distance extending from the free end of the band to a median point therein, which said point I denote as the foot portion 52 of said band.

A housing B secured to the other end portion of the said band has an aperture through which the aforesaid free end portion of said band is passed. The worm (not shown) that is journaled in said housing, is operable by thumbscrew D.

A member of said clamp type holder which is integrated—that is to say embodied—with said band, consists of a sleeve 51 of predetermined length, severed at opposite sides 45 of the upper end thereof, at an oblique angle to the longitudinal axis of said root, to form inclined edges 47, and thence severed longitudinally to form confronting fingers 48. Said fingers are turned inwardly at a plane above the plane of said edges 47, and toward each other, providing a mouth space 49 bounded by the said opposite edges 47 and by the undersides of said fingers.

The confronting ends 46 of said fingers are slanted and spaced apart as indicated in FIG. 8. Integration of the said sleeve and said band in angular relation is had by inserting the free portion of said band through said mouth space 48, thence by applying pressure to the surface of the fingers, thereby the band becoming bound, at its root 52, into metal to metal union with said edges 47 and with the undersides of said fingers. The bore of the said sleeve is of diameter to fit freely on the said head stock 42, the assembly just described constituting the clamp type holder, the clamp thereof being inclined at an oblique angle to the longitudinal axis of the sleeve. Accordingly, the said clamp, when the sleeve is journaled on the said head stock as in FIG. 11 is inclined upwardly at an acute angle to the vertical axis of the stanchion. The sleeve is turnable and, provided as it is at its bottom edge with spaced notches 53 where it rests on the aforesaid studs 43 of said head stock, is capable of being set at a position right, or a position left, of a given position.

To place the fishing rod in the clamp, thumb screw D is unscrewed releasing the free end of the band and thus the clamp becoming open. Upon placing the shank of the rod handle within the confines of the band and upon the fingers 48 of the bearing, and inserting the free end of the band into the aperture of the housing B and tightening the thumb screw, the band is drawn to engripment of the handle portion of the fishing rod, said rod being held at a right angle to the transverse axis U of the clamp.

My invention now appears as in FIG. 11, one fishing rod held by the lower or socket type holder, and the other fishing rod held in the other, or clamp type holder, said rods being amply spaced one above the other, substantially in balance, each turnable in a horizontal plane, each inclined upwardly at an acute angle to the vertical axis of the stanchion, and each being capable of being shifted to and set at desired angle with relation to the range, up-stream or down-stream, of the fishing waters, the depressions 36 of ear 28 of the socket type holder 26 engaged by the cross pin 34; the notches 53 of bearing 51 of the clamp type holder being engaged by the stud 43 of said head stock 42. The said head stock, designed as it is, with the bore 44 thereof, of suitable diameter and length, my invention lends itself to accomodation of a fishing rod the handle portion of which comprises a pintle, indicated by broken lines and marked 55 said pintle being received in said bore, as indicated in FIG. 12.

It will be understood that modifications may be made in details of form and structure, within the scope of the invention as it is defined in the claims, without departing from the spirit and principles of the invention or sacrificing any of its advantages.

What I claim as my invention is:

1. In a fishing rod support, the combination with a stanchion including an upright staff, of a holder in which to receive a fishing rod handle, said holder embodying at its root portion a bearing directed at an oblique angle to the longitudinal axis of said holder and journaled vertically on said staff, for rotative movement thereon, and to incline the holder at an acute angle to the vertical axis of said staff, and means intercoupling and interacting between said staff and said bearing, to support said bearing in its journaled position and to snub it in its rotative movement, said coupler means including a cross pin integrated with the said staff at a point located a predetermined distance below the finial portion of said staff and above the location where the said bearing is journaled, the ends of said pin projecting and forming lateral studs, and the said bearing at its top surface being provided with spaced radial depressions, a helical spring surrounding the staff at position below and impinged against said bearing, and a cotter pin in a hole provided therefor in said staff, to compress the spring and strain the bearing upwardly and impinged against said studs.

2. In combination with a stanchion including a vertical staff, a holder in which to receive a fishing rod handle, said holder embodying at its root portion, a bearing having radial depressions, in its top surface, said bearing being directed at an oblique angle to the longitudinal axis of said holder and journaled on said staff, coupler means intercoupling, and interacting between, said staff and said bearing, to support said bearing in its journaled position and to snub its rotative movement, a tubular head stock mounted and secured axially at its lower portion on the finial portion of said staff by a cross pin integrated with said staff and said head stock, the ends of said cross pin forming studs, and a holder in which to receive a fishing rod handle, said holder consisting of a crosswise clamp embodying at its root portion a sleeve bearing directed at an oblique angle to a perpendicular that bisects the longitudinal axis of said clamp, to incline the clamp at an acute angle to the vertical axis of said head stock, said sleeve bearing having successive notches in its bottom edge, and being journaled on said head stock and there supported in its journaled position by said studs, the said notches being engageable by said studs to snub said sleeve bearing in its rotative movement.

3. A fishing rod support consisting of a holder in which to receive a fishing rod handle, said holder embodying at its root portion a horizontally bifurcated bearing inclined at an oblique angle to the longitudinal axis of said holder, its branches, one above the other, each having a bore, said bores being axially aligned at a right angle to the longitudinal axis of said bearing, and the top surface of the upper branch of said bearing having spaced radial depressions therein, a washer and helical spring assembly disposed between the branches of said bearing and in axial alignment with the bores of said branches, a stanchion staff having a first diametric hole at a location spaced from the upper end of said staff; and having a second diametric hole at a plane above the first named hole a distance equal to at least one half of the distance between the branches of the said holder bearing; and a third diametric hole at a plane above the said second hole; the said staff being passed upwardly through the bore of the lower branch, through the washer and spring assembly, and through the bore of said upper branch of said bearing, to where the first named hole is at a plane between the branches of said bearing, a drive-fit pin, a cotter pin, said cotter pin applied at the first named hole, the washer spring assembly being immediately above the resting on said cotter pin, then, upon manually lowering the holder bearing to a plane wherein the upper branch of said bearing is at a plane below said second hole (thereby the spring compressed and loaded) and then, upon manually applying the drive-fit pin at said second hole (the spring being maintained in loaded status against the underside of the upper branch of said bearing), the said holder bearing will have become supported in its journaled position on the said staff, and strained upwardly, and impinged against the cross studs of said staff the radial depressions in the upper branch of said holder bearing become engaged with said studs.

References Cited in the file of this patent

UNITED STATES PATENTS

| | | |
|---|---|---|
| 947,978 | McComb | Feb. 1, 1910 |
| 1,653,083 | Blaw | Dec. 20, 1927 |
| 1,719,695 | Ferguson | July 2, 1929 |
| 2,211,278 | Febvre | Aug. 13, 1940 |
| 2,261,527 | Shannon | Nov. 4, 1941 |
| 2,426,881 | Johnson | Sept. 2, 1947 |
| 2,523,356 | Cherry | Sept. 26, 1950 |
| 2,663,531 | Rubano | Dec. 22, 1953 |
| 2,704,412 | Davis | Mar. 22, 1955 |
| 2,800,164 | Chambers | July 23, 1957 |